United States Patent Office 3,055,157
Patented Sept. 25, 1962

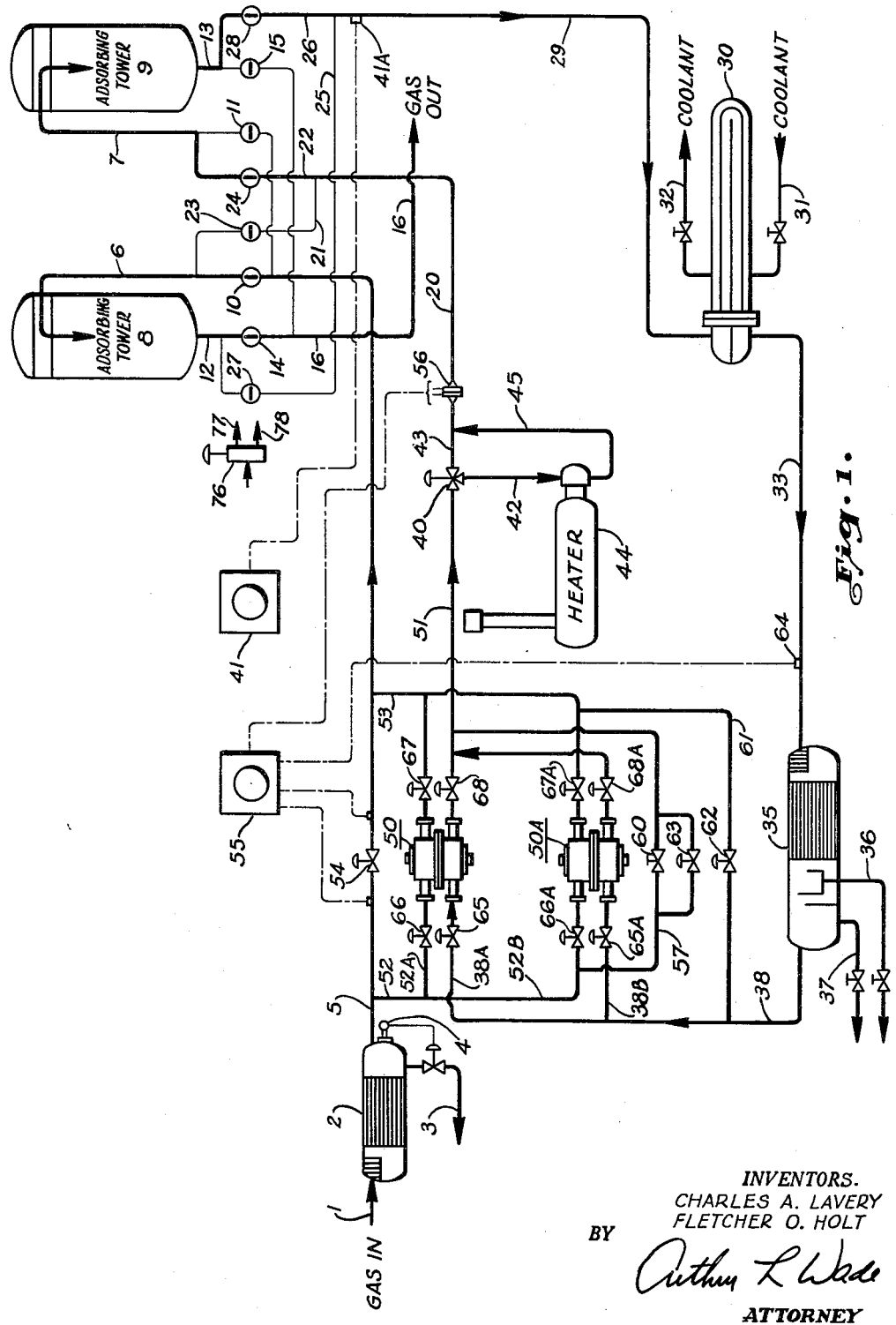

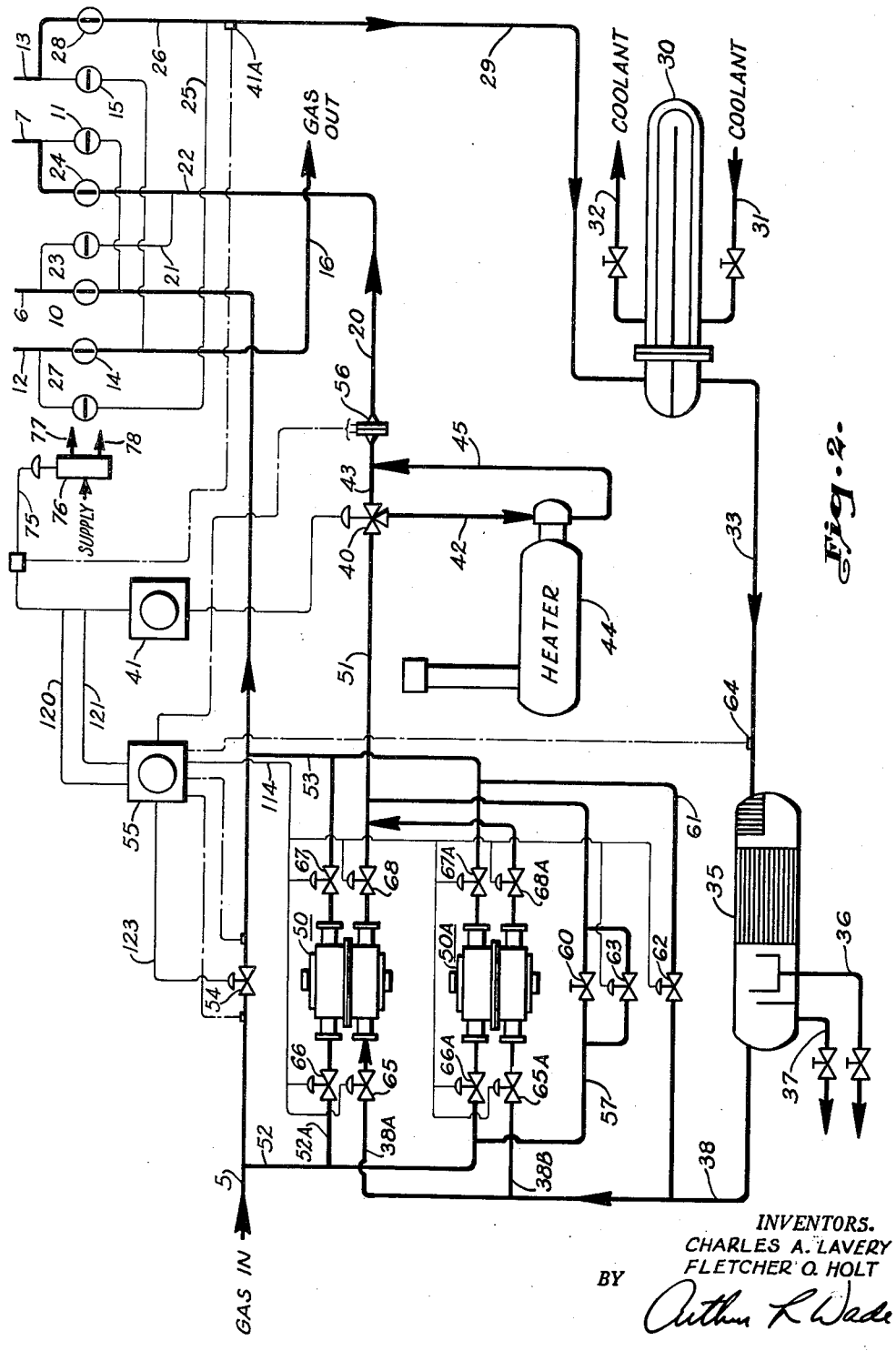

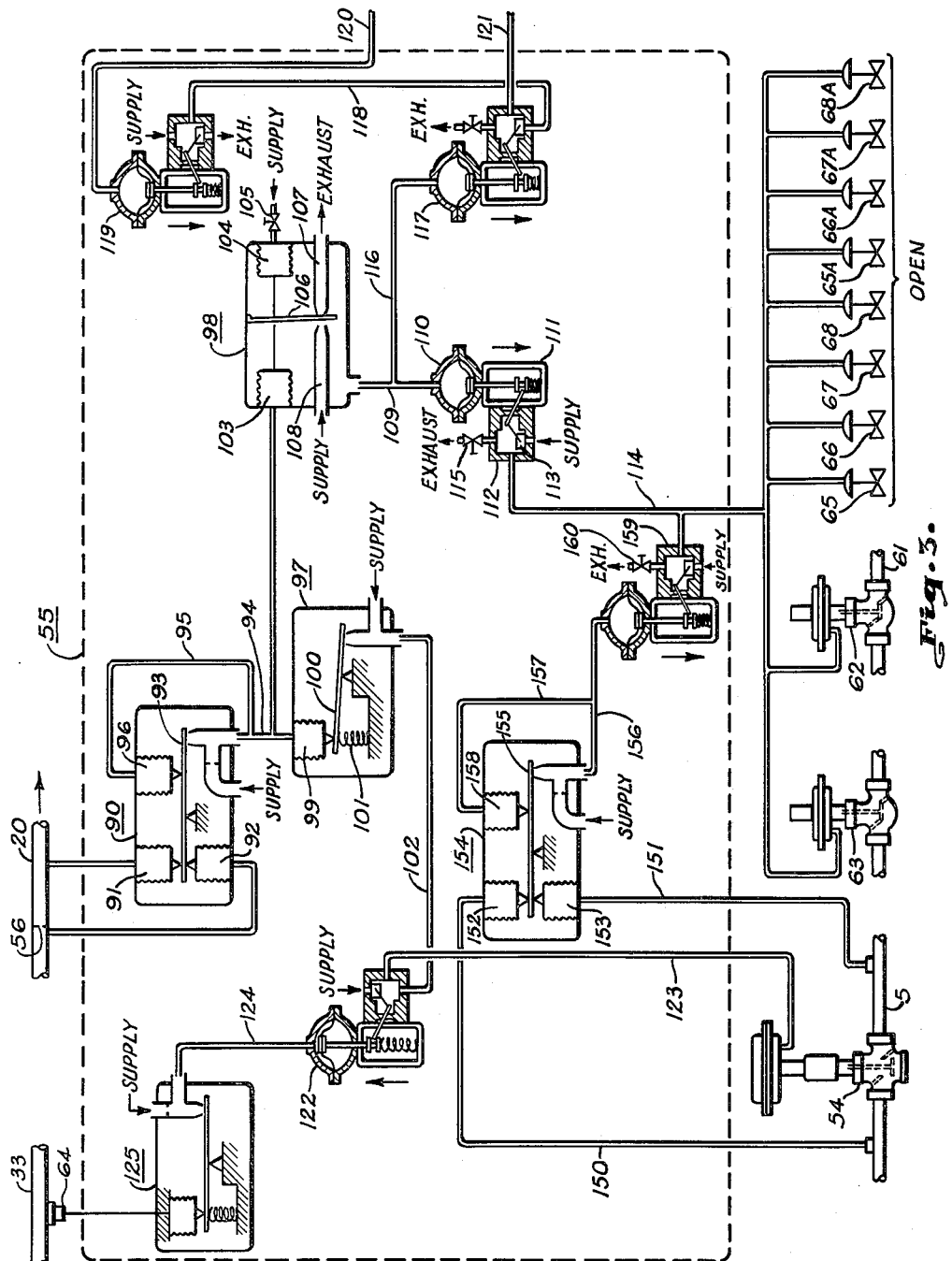

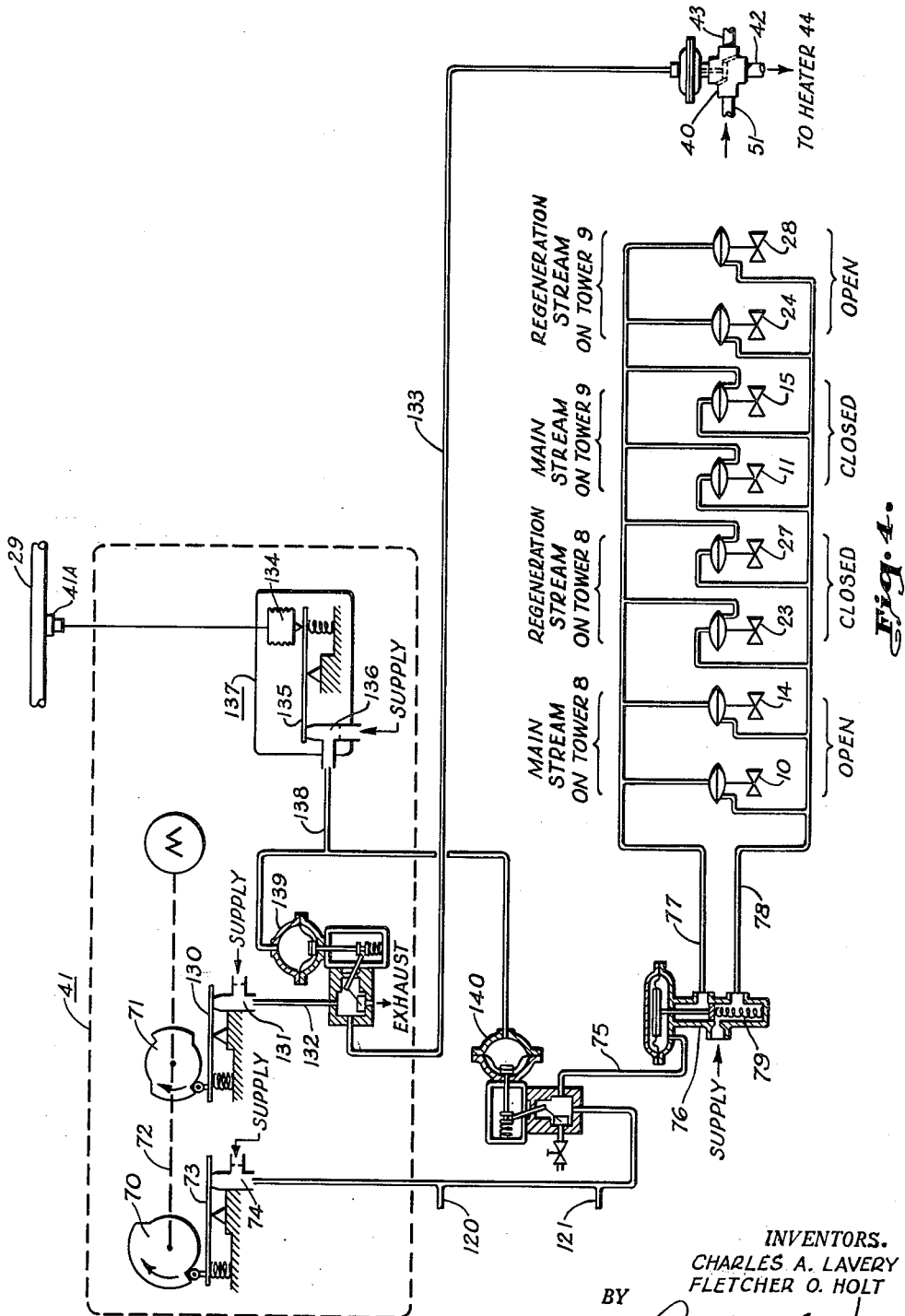

3,055,157
CONTROL SYSTEM FOR CLOSED CYCLE GAS DE-
HYDRATION AND HYDROCARBON RECOVERY
SYSTEM
Charles A. Lavery and Fletcher O. Holt, Tulsa, Okla.,
assignors to National Tank Company, Tulsa, Okla., a
corporation of Nevada
Filed Jan. 11, 1961, Ser. No. 82,102
11 Claims. (Cl. 55—33)

This invention relates to systems for processing natural gas to remove moisture and condensable hydrocarbons. More specifically, the invention relates to closed cycle dehydration and hydrocarbon recovery systems.

For the purpose of disclosing this invention, the flow of gas to be processed will be referred to as the flow, or main stream. The flow, or main, stream of natural gas from a well head is always saturated, or partially saturated, with moisture in accordance with its origin, pressure and temperature. If the gas is transmitted with this moisture in it, it may severely corrode the metal pipe line through which it is transmitted. Further, this moisture, at lowered temperatures, may form hydrates with hydrocarbons which will clog the pipe lines and valves. It is common practice to conduct wet gas through large cylinders filled with adsorbent material. Using at least two cylinders, it is possible to continuously transmit gas through adsorbent by alternating between the towers. The towers, with adsorbent material at least partially saturated with moisture, are reactivated with either heated air or gas.

Additionally, it is recognized that such streams of natural gas are saturated, or partially saturated, with valuable condensable hydrocarbons, such as gasoline, which can be removed from the gas stream by adsorbent material. The removal of both the condensable hydrocarbons and water from natural gas streams, prior to or during transmission is possible with a common adsorbent material and must be done efficiently and economically. Many of the problems of water and hydrocarbon removal by adsorbent material center about the use of the reactivation, or regeneration, fluid with which the water and hydrocarbons are removed from the saturated adsorption material. It has been customary to split off a portion of the saturated stream and use it for this purpose. The split-off, reactivation, stream is passed through a heater to elevate its temperature to a degree that will raise its ability to vaporize and remove water and hydrocarbons as it passes through the beds of adsorption material. After passage through the beds the reactivation stream is cooled in a condenser to extract the liquids. The output of the condenser is received in a separator where the water and hydrocarbons are removed as separate liquid phases. The prior art shows how the gaseous potion of the reactivation stream may be returned to the main stream on its way through the adsorption step. However, there are fundamental advantages to recycling the reactivation fluid rather than returning it to the flow, or main stream. Regardless of whether the reactivation stream is returned to the main stream, or recycled as a captive stream, there is the problem of providing energy for its circulation through the heater, adsorption material, condenser and separator.

The captive reactivation, or regeneration, fluid of an adsorption process can be circulated with the power of the main stream. A mechanical device in the form of a motor-compressor, can be arranged to bridge between the two circuits in transferring the energy of the flow in the main stream to the flow in the captive regeneration stream for circulating the regeneration gas through the captive circuit.

When a particular size and capacity is fixed for a motor-compressor unit, it is necessary to use two or more units of the fixed size to circulate a captive regeneration gas stream which is larger than can be circulated by a single unit. When one of a plurality of these motor-compressors fail, the load shifts to those operative units remaining. The load of the remaining units will usually accelerate their failure. One of the problems met by this invention is that of safeguarding the operation of the motor-compressor units that are operative following the failure of one or more of the units.

Operative conditions of the captive regeneration circuit have been recognized as control elements to isolate the motor-compressor units from the system and to convert the system to an open cycle regeneration system for at least the period required to correct malfunctions. Circulating flow in the captive circuit has been utilized. Temperature of the regeneration gas in the captive circuit has also been utlized as an operative condition to make the conversion.

It is now appreciated that when two or more motor-compressor units are employed to drive the gas in the regenerating circuit, the flow of the gas in the regenerating circuit can become an unreliable index upon which to base the conversion. The prior art, utilizing a single motor-compressor unit, depended upon a malfunction of the unit to decrease the regeneration gas flow. However, when more than one unit is available, the flow will not necessarily decrease. The control system responsive to the regeneration flow will merely increase the differential pressure drop in the main gas stream across the motor side of the motor-compressor. The increase in load on the remaining units will then accelerate their destruction as they attempt to keep the regeneration flow up to its required value.

A principal object of the present invention is to convert a closed cycle type of reactivation dehydration and hydrocarbon recovery system to an open cycle type of regeneration system when an operative variable of the main stream circuit reaches a predetermined value.

Another object is to isolate the motor driven by the main stream, and the compressor, from the regeneration stream when conversion from a closed cycle to an open cycle is made.

Another object is to maintain control of the differential pressure drop developing the force for circulating the reactivation gas, by the flow through the reactivation circuit, when the dehydration system is using a closed cycle type of regeneration and after it is converted to using an open cycle type of regeneration.

The present invention contemplates a first circuit for conducting natural gases of the circuit through a bed of adsorbent material in order to remove water and hydrocarbons from the gas by contact with the adsorbent material and supplying power to a plurality of motors. A second circuit arranged to be driven by a plurality of compressors, each compressor powered by one of the motors to alternately conduct a reactivating, or regenerating, gas through a heating zone and then the bed of adsorbent material. A first conduit is arranged between the second circuit and the first circuit, upstream of a differential valve in the first circuit. A second conduit is arranged between the inlet to the compressors and the outlet from the motors. A valve is included in the second conduit. A means is arranged to detect an operative condition in the first circuit and open the valve in the second conduit to permit free communicating between the second circuit and the first circuit when the operative condition reaches a predetermined value in converting the system from a closed to an open cycle type of regeneration system.

The invention further contemplates that the first conduit arranged to connect between the second circuit and a point upstream of the differential valve in the first circuit include a valve which will be actuated by the means detecting the operative condition in the first circuit to open the valve in the first conduit at the same time the valve in the second conduit is opened by the means detecting the operative condition in the first circuit in connecting the cycle.

The invention further contemplates a valve in each inlet and outlet of both the motor and compressor of each of the units which can be actuated manually, or automatically, by the means arranged to detect an operative condition in the first and second circuits, to isolate the motor-compressor from the system when conversion takes place from a closed to an open cycle type of reactivation system.

The invention further contemplates the differential valve arranged between the connections of the motors to the first circuit of the main stream, and the connections of the first and second conduits to the first circuit of the main stream, which will be regulated by the flow of regeneration gas to develop the differential pressure of the regeneration circuit required to circulate its gas on both closed and open cycle type of regeneration systems.

The invention further contemplates a valve system controlled by a time-cycle controller to alternately pass gas to be dehydrated in a first circuit and reactivating gas in a second circuit through beds of adsorbent material. The impulses from the time-cycle controller are applied to the valve system under the monitoring of means detecting an operative condition in the first and second circuits in order to maintain the valve system in the position it had when one of the operative conditions reaches its predetermined value.

Other objects, advantages and features of this invention will become more apparent to one skilled in the art upon consideration of the written specification, appended claims, and the attached drawings wherein;

FIG. 1 is a diagrammatic flow diagram of a hydrocarbon recovery and dehydration system which is controlled by a system embodying the present invention;

FIG. 2 is an enlarged portion of FIG. 1 showing the complete control system responding to, and controlling, variables of the recovery system;

FIG. 3 is a detailed diagrammatic showing of a part of the complete control system in which the invention is embodied; and FIG. 4 is a detailed diagrammatic showing of the remaining part of the complete control system in which the invention is embodied.

FIGS. 1 and 2 are to be considered together. FIG. 2 shows structure which is a portion of the structure of FIG. 1 on a larger scale.

Temperature is sensed at two points in the system disclosed in FIGS. 1 and 2. Flow is also sensed at two points. These variables develop forces which are applied to the valve system disclosed. If FIG. 1 were utilized alone, the scale employed to show the complete recovery and dehydration system would be greatly encumbered with the interconnecting control pipes and conduits. Therefore, in FIG. 1, only the variables sensed are indicated as connected to instruments responsive to their signals. FIG. 1 becomes a regeneration of the related flow patterns for the two basic circuits.

FIG. 2 shows the complete control system, but the towers and liquid knockout have not been shown in order for the scale of the drawing to be enlarged to where all controlling, and controlled, elements can be shown with a minimum of confusion.

*First Circuit*

In FIG. 1, conduit 1 represents the means of bringing natural gas into the adsorption process controlled in accordance with the invention. The gas of conduit 1 is to be dried in the process and its condensable hydrocarbon content extracted. Conduit 1 specifically introduces the gas into separator 2.

Separator 2 may take any of several well-known forms. Any well-known form of vessel in which liquid and gaseous phases separate will be satisfactory. The separation process carried on in separator 2 is a relatively crude function of knocking the liquids which arrive in conduit 1 from the gas stream. The liquids may be both water and hydrocarbons and are removed through conduit 3, controlled by level controller 4. The gaseous phases pass from separator 2 by way of conduit 5.

Conduit 5 is a part of the first circuit of the process which handles the main, or flow, stream of natural gas from which condensable hydrocarbons and water are removed by adsorption. Conduit 5 is divided into branch conduit 6 and branch conduit 7 in order to conduct the main stream through adsorbent beds. These branch conduits specifically connect to adsorbing tower 8 and adsorbing tower 9 and are valved to alternately direct the gas of conduit 5 through beds of adsorbent material in these towers. As illustrated, the towers are, essentially, cylinders with their longitudinal axes extended vertically. The flows from conduits 6 and 7 are directed downwardly through these towers.

Valve 10 in branch conduit 6 and valve 11 in branch conduit 7 alternately open and close to direct the main stream of conduit 5 through the adsorbent beds. Branch conduit 6 is represented with a relatively heavy line of drawing on each side of its valve 10, to indicate that the main stream is passing through valve 10 and into tower 8.

Conduit 12 removes gas from tower 8. Conduit 13 removes gas from tower 9. Valves 14 and 15 alternately direct the main, or flow, gas stream from the towers into conduit 16. Conduit 12, through valve 14, is represented by a heavy line in order to indicate that the flow stream is passing from tower 8 into outlet conduit 16. The main circuit is now more completely defined as conduit 5 passing through valve 10 and valve 14 to conduit 16, as shown in FIG. 1, or alternately through valve 11 and valve 15 to conduit 16. The two sets of valves are time-cycled between their two positions to alternately open and close in directing the main stream through the two adsorbent beds as each bed approaches saturation with water and condensable hydrocarbons.

*Adsorbent Material*

Various types of adsorbent material may be employed in towers 8 and 9. Silica gel has been successfully used to recover a large percentage of the condensable hydrocarbons in main streams. The selection of the specific adsorption material, and the arrangement of flow within the towers, depends on specific design conditions which are not considered further.

Once the adsorbent material has adsorbed the water and condensable hydrocarbons from the main stream, another stream of gas is required to remove these products from the bed. Specifically, a gas stream is passed through the bed, heated enough to vaporize the water and hydrocarbons. The adsorbent bed is thereby reactivated so it can again be used to remove another quantity of water and hydrocarbons from the main stream. The heated gas stream, with the vaporized water and hydrocarbons contained therein, is then cooled to condense the water and hydrocarbons.

*Second Circuit*

The circuit for the reactivation stream of gas is referred to as the second circuit and is traced as including conduit 20. Branch conduits 21 and 22 alternately pass the reactivation gas from conduit 20 through towers 8 and 9. Branch conduit 21 is connected to conduit 6 between valve 10 and tower 8. Branch conduit 22 is connected to conduit 7 between valve 11 and tower 9. Conduit 21 passes through valve 23 and conduit 22 passes through valve 24. Conduit 22 is represented in heavy outline to indicate that the reactivation gas from conduit 20 is passing to tower 9 at the same time the main stream from conduit 5 is being passed to tower 8.

The reactivation gas passed through the towers is also removed through conduits 12 and 13. However, valves 14 and 15 are switched to prevent this reactivation gas from passing out of the system through conduit 16. Conduits 25 and 26 connect to conduits 12 and 13 between valves 14 and 15 and their respective towers. Valves 27 and 28 are included in conduits 25 and 26 in order to alternately pass the reactivation gas into conduit 29. Conduit 26 is represented in heavy line to show the circuit for the reactivation gas is completed through tower 9 from conduit 20 to conduit 29.

*Recovery From Reactivation Gas*

The vaporized hydrocarbon and water in the heated reactivation gas of conduit 29 is condensed therefrom in order to remove the water and recover the hydrocarbons. Several choices of cooling sources may be available for condensing these liquids from the reactivation gas in conduit 29. The one, or combination, of sources selected is a matter of design, involving the characteristics of the particular main stream, the availability of relatively cool fluids, size of equipment, and etc.

In FIGS. 1 and 2 the reactivation stream of conduit 29 is illustrated as being simply cooled by an available stream of coolant, such as water. Heat exchanger 30 is shown as bringing the coolant of conduits 31 and 32 into intimate association with the captive, reactivation, stream of conduit 29. Vaporized hydrocarbons and water are thereby condensed into liquid and the mixture of condensed liquids and uncondensed gas is passed into conduit 33.

Three-phase separation of the mixture of liquids and gas in conduit 33 takes place in separator 35, one of many well-known forms. The liquefied hydrocarbons are removed through conduit 36, conducted to a stabilizer, and/or storage, not shown. Water is removed through conduit 37 for disposal. The remaining, cooled, reactivation gas is then delivered to conduit 38 for return to conduit 20 for the work of cooling the adsorption beds and removing additional water and hydrocarbons from the beds.

*Cooling Tower 8 and 9*

Using the specific arrangement shown in FIG. 1, it is reviewed that tower 9 is shown with a hot stream of reactivation gas passing through it in order to vaporize the hydrocarbons and the water left in the bed by the main stream. After this vaporization step, the bed within tower 9 should be cooled before the main stream is again passed through it. Cooling of the bed in tower 9 will raise its adsorptive capacity. Further cooling the bed of tower 9 will prevent its heat being passed into conduit 16 when the main stream is passed through it.

Dumping too much heat from tower 9 into the main stream of conduit 16 would be dangerous. The resulting rise in temperature in the conduit 16 could buckle transmission lines and rupture connections and equipment downstream of the process, requiring costly repairs and replacements. Therefore, a portion of the reactivation period for tower 9 is preferably used to pass a cooling stream of fluid through the bed of tower 9. Usually, it is preferable to simply bypass a heater provided for the reactivation circuit so the cool stream in conduit 38 upstream of the heater will reduce the temperature within the tower 9. It might also be feasible to route at least a portion of the main stream leaving tower 8 through tower 9 for this purpose if the heat balance of the system kept the temperature rise of the processed gas in conduit 16 low enough to protect the components downstream.

To carry out the technique of utilizing the captive, regeneration, stream itself to cool tower 9, valve 40 is provided to alternately pass the cool stream of conduit 38 through a heating source or directly into conduit 20. A time-cycle controller 41 is utilized to allocate the portion of each cycle used for this purpose. Controller 41 also contains a time-cycle mechanism whereby the two sets of tower valves may be switched to alternate the towers between the main and the reactivation streams.

As the heat from the towers 8 and 9 is so important, a temperature responsive element 41A is placed in conduit 29, below the junction of branch conduit 25 and 26. Element 41A actuates a relay in the circuit between the time-cycle controller 41 and the tower valves. Should the temperature out of the tower on regeneration not be sufficiently low to safeguard downstream equipment, element 41A will hold the valves in the position they had when the excessive temperature was reached.

Valve 40 routes the cool stream of conduit 38 through either conduit 42 or 43.

Conduit 42 takes the cool stream through heater 44 to pick up the heat required for reactivation of the adsorbent material. Conduit 45 receives the heated reactivation stream and passes it directly to conduit 20. Thus, valve 40 routes the cool stream of the second circuit from conduit 38 to conduit 20, alternately heated for predetermined times prior to passage through the towers.

*Actual Operating Conditions*

It is reasonable to expect about 80° F. temperature and 1200 pounds per square inch or more for a main stream received by the process. The reactivation gas of conduit 20 may be elevated to the order of 600° F. in order to vaporize the hydrocarbon and water in the adsorbent beds. In passing through a tower, the heated reactivation stream may be dropped to the order of 360° F. To condense liquids from this reactivation gas, condenser 30 may drop the temperature to the order of 85° F. Thus, it can be seen that conduit 20 receives the reactivation gas at a wide range of temperature values. Conduit 43 may deliver the reactivation gas in the order of 85° to 100° F. while conduit 45 may deliver the reactivation gas to conduit 20 in the order of 600° F.

*Motor-Compressors 50 and 50A*

FIGS. 1 and 2 illustrate a mechanical means to transfer the flow energy of the main stream in conduits 1 and 5 to the reactivation, or captive, circuit. This mechanical link is specifically embodied in motor-compressors 50 and 50A such as disclosed and claimed specifically in S.N. 740,143, filed June 5, 1958, by Joseph L. Maher and Richard F. Baker, and controlled in S.N. 740,144, filed June 5, 1958 by Edwards M. Fontaine and Ernest C. Hill, both applications being assigned to the assignee in the present case.

Essentially, each motor-compressor 50, 50A is a sliding vane type of motor on a common shaft with a sliding vane type of compressor. The compressor sides of the units receive the cool gas stream of conduit 38 in parallel and deliver it to conduit 51, connected directly to valve 40. Valve 40, as indicated heretofore, routes this gas output of the paralleled compressors to either conduit 42 or conduit 43.

The motor sides of units 50 and 50A are connected in parallel also and in a shunt conduits 52—53 around valve 54. Differential valve 54 is in conduit 5 and is positioned to regulate the amount of the main stream which is passed through conduits 52—53. Depending on the position of valve 54, more or less of the main stream gas is received by conduit 52 to develop the differential pressure force to regulate the speed of motor-compressors 50 and 50A.

Valve 54 is normally modulated by the force developed from the differential pressures across orifice 56 in conduit 20. As the differential pressure across orifice 56 varies, mechanism within controller 55 adjusts valve 54 to change the differential pressure across the motor of unit 50. Motor-compressor 50 thus has its speed adjusted to maintain the differential pressure across orifice 56.

*Orifice 56*

Orifice 56 is exposed to the variation in temperature of the regeneration gas as it is received from either conduit 45 or conduit 43. This flowing temperature of the captive regeneration stream thus varies the flow rate through this second circuit. Regulation of valve 54 from the differential across orifice 56 is in the correct direction to maintain the flow rate through orifice 56. As the flowing temperature decreases from the insertion of the gas stream of conduit 43 into conduit 20, motor-compressors 50 and 50A are caused to increase in output. The flow rate of the closed circuit goes up as the flowing temperature goes down. Alternately, as the heated stream of conduit 45 is caused to flow through orifice 56, the differential variation regulates valve 54 to slow motor-compressors 50 and 50A and decrease the flow rate through the closed second circuit. The result is automatic regulation in the correct direction to maintain the flow rate of regeneration gas required to efficiently strip the adsorbent material of the tower of water and hydrocarbons and cool the bed of material prior to its again receiving the main flow stream.

If but one of the compressors 50, 50A is used, and it experiences a sudden, or gradual, mechanical failure, the flow of regeneration gas will drop to a predetermined minimum value, at the predetermined minimum value, it is necessary to remove the single motor-compressor from both circuits. Thus, when one motor-compressor is used, the flow rate of gas in the regeneration circuit is a critical operative variable.

United States Patent 2,957,544, issued October 25, 1960 discloses how to utilize the force of a predetermined value of this operative variable to convert the normally closed cycle of the regeneration system into an open cycle system, arrest the tower switching, and effectively remove a single motor-compressor from service. The regulation of valve 54, to develop the differential pressure force for circulating regeneration gas, continues on open, as well as closed, cycle operation.

Another operative variable of the regeneration gas is its temperature. The temperature of this gas going into the compressor side of one or more motor-compressors should be monitored and maintained below a predetermined value. Under the present design limitations, this incoming temperature must not exceed 125° F. or the clearances between movable mechanical parts within the compressor sides of the motor-compressor units will be reduced until the parts jam together.

The temperature of the regeneration circuit, in that portion affecting the motor-compressors, is guarded by a mechanism responding to the effectiveness of the heat exchanger 30 to keep the temperature under control. Should this temperature exceed the predetermined limit, this operative variable will isolate the modulating impulse developed by flow in the regeneration circuit from valve 54 and cause the valve to open. This malfunction of the regeneration circuit is very serious. The entire system will shut down when the temperature to the compressor side exceeds the predetermined limit, and it will ordinarily be expected that a major repair or adjustment will have to be made to bring the temperature of the regeneration circuit down to normal.

The other temperature of the regeneration circuit which is most important is that of the towers, sensed by 41A. This temperature is in direct control of the impulses to the tower valves. Should this temperature be out of limits, both the tower valve switching and the cooling-heating valve switching are controlled directly to prevent excessive heat going down conduit 16 with the main stream.

The Present Problem

Various operative variables of the regeneration circuit have been considered. Some, or certain values, of these variables have been considered as control indices for converting the normally closed cycle of the regeneration system into an open cycle system by effectively removing a motor-compressor unit from service. However, the use of a predetermined value of regeneration gas flow as a control index has not been successful when a plurality of motor-compressors is used.

FIGS. 1 and 2 disclose motor-compressors 50 and 50A as an example of a plurality of these units for this purpose. Where the quantity of regeneration gas required for a particular system exceeds the capacity of the available size of motor-compressor, a plurality of the units may be used. The compressor sides of the unit are connected in parallel to gain the capacity required. Conduit 38, from separator 35, has branch 38A to the compressor side of unit 50 and branch 38B to the compressor side of unit 50A. Beyond the units 50 and 50A, branch conduits 38A and 38B join conduit 51 of the regeneration circuit to complete the parallel connection into the regeneration circuit.

The motor sides of the units are disclosed as connected in parallel to the main stream conduit 5. The present problem is not altered by whether the motor sides are connected in series or in parallel. Therefore, parallel connection of the motor sides was selected for this disclosure. Specifically, shunt conduit 52 has branch conduit 52A to the motor side of unit 50 and branch 52B to the motor side of unit 50A. Beyond the units 50 and 50A, branch conduits 52A and 52B join shunt conduit 53 to complete the parallel connection in the shunt circuit around regulated valve 54 in main stream conduit 5.

The present problem arises when one of the plurality of the motor-compressor units fails, or start to fail. U.S. Patent Baker 2,957,544, issued October 25, 1960, anticipated a sudden, or gradual, mechanical failure of a single motor-compressor unit. The flow of regeneration gas would drop to a predetermined minimum value. This flow index would then be used to make the closed-open conversion. However, in the present system failure of one of the motor-compressor units would mean that the control over the regulation of valve 54 would increase the drop across the motor sides of the units. Overloaded in this manner, the units remaining operative are driven to destruction. When the last motor-compressor unit failed the decrease in regeneration gas flow would make the closed-open conversion, too late to save any of the motor-compressor units.

The Solution

The present invention is based on the discovery of a control index for converting from a closed circuit to an open circuit when a plurality of motor-compressor units are used which index is positively variable with the failure of one of the plurality of units. This index is the differential pressure drop across regulated valve 54. As single motor-compressor units go out, this differential pressure drop increases to overload the units which remain operative. Therefore, an increase in this control index to a predetermined value is utilized to make the closed-open conversion necessary to save the remaining units and maintain the entire process operative to recover liquifiable hydrocarbons from the gas of the main stream.

Detection pipes are indicated as connected into conduit 5 upstream and downstream of regulated valve 54. These pipes take their respective pressures, as a differential, into controller 55. The control signal developed in controller 55 is then applied to the proper valves to bring about the conversion.

Cross-Over Conduit 57

It has been described how the gas in the second circuit is alternately heated and cooled by the functions of valve 40 either shunting the reactivation gas through heater 44 or directly to conduit 20. This alternate heating and cooling of the captive circuit results in the inventory of gaseous fluid in the circuit fluctuating as the volume of the circuit conduits and vessels remain constant. Transfer of gaseous fluid between the main and reactivation circuits is desirable. Conduit 57 provides a means for making this treater of gas. Specifically, conduit 57 is connected to the input sides of the motors of units 50 and 50A and to the output sides of the compressors of the units. Through this conduit, the gases of the two circuits interchange as their volumes contract and expand relative to each other. The result is to provide an inventory of gas in the reactivation circuit which fluctuates as it functions to recover hydrocarbons and extract water from the main stream of gas.

Cross-over conduit 57 creates at least one problem when two-position tower valves are used. It will be recalled that the valves of the system alternating the connection of the main and reactivation gas streams between towers 8 and 9 are actuated simultaneously by the time-cycle controller 41. When these valves all shift from one of their positions to the other there is a finite period of time when they offer relatively little restriction to gas flow between the two circuits. Therefore, during each switching action, the differential in pressure between the two circuits causes a transfer of gas from the circuit of the higher pressure to the circuit of the lower pressure. The transfer reduces the pressure differential between conduits 52 and 53, across the motors of units 50 and 50A as the gas of the main circuit surges through conduit 57. Motor-compressors 50 and 50A momentarily stop. After the valve shift is complete, the differential pressure is again developed across units 50 and 50A and the units begin to rotate with such sudden force as to place excessive mechanical strain on their parts. Therefore, a means is required to reduce the rate of transfer of gas through conduit 57 during tower valve shift.

It has been found desirable to include throttling valve 60 in conduit 57. Valve 60 may be manually adjusted to control the transfer rate through conduit 57 so the required minimum differential across the motors of units 50 and 50A will be maintained during tower valve shift. The problem of motor-compressor failure from this cause is thereby solved.

*Closed to Open-Cycle Conversion*

Basically, to convert the closed cycle regeneration system of FIGS. 1 and 2 to an open cycle regeneration system, it is necessary to connect conduit 52 to conduit 51 and conduit 38 to conduit 53. Cross-over conduit 57 normally connects conduits 52 and 51 through throttling valve 60. The present invention additionally provides conduit 61 between conduit 38 and conduit 53. A two-position valve 62 is provided in conduit 61. With conduits 57 and 61 connecting the main and regenerative streams as illustrated, regulation of valve 54 will force a portion of the main stream gas through the conduit 20 for regeneration and recovery of hydrocarbons. Of course, this connection returns this gas to the main stream of conduit 5 downstream of differential valve 54. Thus, the advantages of a closed, or captive, cycle are not realized. However, this alternate mode of operation does provide a means for maintaining the overall dehydration and hydrocarbon recovery system in operation when motor-compressors 50 and/or 50A fails or an operative variable of the closed cycle exceeds its predetermined limits. There remains, only the problem of removing the restriction to flow through conduit 57 and conduit 61 when the conversion is made.

Two-position valve 62 is opened by the control system in which the present invention is embodied. Valve 63 is provided as a by-pass around throttling valve 60. Valve 63 is opened at the same time valve 62 is opened to remove the restriction of valve 60 in conduit 57. In FIG. 2, both valve 62 and valve 63 are indicated as controlled in parallel by mechanism in 55. More generally, the conversion is made when the operative variable of pressure differential across valve 54 increases to a predetermined value in the captive regeneration, circuit.

When the operative variable of the main stream circuit has caused the conversion from a closed to an open cycle type of reactivation system, it is desired to isolate motor-compressors 50 and 50A from the main and regeneration circuits. Therefore, valves 65, 66, 67 and 68 and 65A, 66A, 67A and 68A are indicated in the conduits to and from units 50 and 50A. These valves may be closed and units 50 and 50A removed for service or replacement. It is feasible to automatically close valves 65—68 from the impulse developed to open valves 62 and 63. If it is uneconomical to provide the means to carry out this automatic function it may be accomplished by manually operated valves.

*Temperature of the Regeneration Circuit*

When the flow through orifice 56 was previously discussed, the operative variable of temperataure in the regeneration circuit directly associated with motor-compressors 50 and 50A was seen as desirably monitored. In the specific form adopted for motor-compressors 50 and 50A, it is desirable that the temperature to the compressor sides be kept below 125° F. as explained previously.

Temperature responsive element 64 is placed in conduit 33 to respond to the effectiveness of heat exchanger 30 on the circuit directly associated with motor-compressors 50 and 50A. This operative variable develops a force by the mechanism in unit 55 with which to open differential valve 54 to a maximum when the temperature of the gas in conduit 33 exceeds a predetermined maximum. The specific mechanism in control unit 55 which responds to element 64 to open valve 54 is disclosed in greater detail in FIG. 3.

Temperature responsive element 41A is placed in conduit 29 of the second circuit to respond to the temperature of the regeneration gas coming from either tower 8 or tower 9. This operative variable of the captive cycle develops a force through relays to maintain the tower valves at the position they had when the temperature exceeded its predetermined maximum value and maintain the valve 40 in the cooling position. The specific mechanism in control unit 41, and the pipe to the tower valves which responds to element 41A, is disclosed in greater detail in FIG. 4.

*FIGS. 3 and 4*

FIGS. 3 and 4 must be taken together. Their structure is shown connected together by pipes for fluid pressure control signals. Together, these figures show in detail how the operative variables of the regenerative circuit, and the control impulses of the time-cycle controller 41, are applied to position differential valve 54, conversion valves 62 and 63, isolation valves 65—68, 65A—68A, tower valves 10, 14, 23, 27, 11, 15, 24, 28 and heating-cooling valve 40 to carry out the objectives of the invention. The description in connection with FIGS. 1 and 2 was comparatively general, dealing with the overall end results of functional relation between the primary elements with which the variables of flow, temperature and differential pressure are measured and the results of directing the flows of the first and second circuits with valves as the controlled elements. FIGS. 3 and 4 show just how the control impulses developed are coordinated to attain a cohesion of control actions in the system.

*Controller 55*

The diagrammatic block of controller 55 in FIGS. 1 and 2 has been expanded into its various components in FIG. 3. The basic, normal, function of controller 55 is to produce a fluid pressure control signal with which to modulate the position of valve 54 in conduit 5. This fluid pressure is developed by orifice 56 in conduit 20.

*Transmitter 90*

In FIG. 3 conduit 20 is depicted with orifice 56 established to develop differential pressures related to flow rate through the orifice. These differential pressures are specifically applied as an input to a device which will develop fluid pressures values over a range corresponding to the range of differential pressure values. Diagrammatically, the essential elements of a force balance fluid pressure transmitter are indicated at 90. A specific device suitable for this purpose is manufactured by the Taylor Instrument Company, Rochester, New York and is shown in its Instruction Section 2B200, being designated as type 333R and marketed under the trademark Transaire.

Differential pressure transmitter 90 receives the pressures across orifice 56 in bellows 91 and 92. The force developed by these bellows on one end of beam 93 rotates the beam about its pivot. Beam 93 has a fluid pressure couple, in the form of a vane and nozzle, at the other end of the beam. The output fluid pressure developed by the vane and nozzle, supplied fluid pressure in the order of 20 p.s.i., is placed in conduit 94. The fluid pressure of conduit 93 is not only the output of the transmitter 90, but is routed by conduit 95 as an input to bellows 96 to balance the differential force of bellows 91 and 92 on beam 93. The variation of output fluid pressure in conduit 94 is thereby given a definite functional relation to the flow through orifice 56.

Flow Controller 97

The fluid pressure signal of conduit 94 is applied in parallel to a flow controller 97 and a limit, or set point, controller 98. Controller 97 may be given the specific form of the Fulscope Controller manufactured by the Taylor Instrument Company and disclosed in its Instruction Section 1A204. In controller 97, the fluid pressure impulse of conduit 94 is received in bellows 99 to position a beam 100 against the compression force of the spring 101. Thus, a substantial range of movement is given beam 100 for development of various control actions such as proportional band, derivative, rate and reset in the output of the flow controller 97. Mechanisms for introducing the various control actions are not disclosed here. Only the motion of beam 100 by bellows 99 on one end, essential to develop an output from the nozzle-vane combination on the other end of the beam 100, is indicated. The fluid pressure output developed by controller 97 is established in conduit 102 and is applied to differential valve 54.

Set Point Controller 98

Parallel with the development of the fluid pressure output of conduit 102, set point controller 98 receives the fluid pressure of conduit 94 in bellows 103. A bellows 104 has a fluid pressure developed therein by throttling a fluid pressure supply through valve 105. Bellows 103 and 104 are mechanically linked to a flapper 106. Flapper 106 is positioned with respect to a vent nozzle 107 and the supply nozzle 108. The entire case of set point controller 98 contains the pressure developed by the co-operation between the vane 106 and nozzles 107, 108. This co-operation establishes a fluid pressure in conduit 109.

As disclosed, set point controller 98 compares the fluid pressure impulse developed in conduit 94 with the manually established fluid pressure in bellows 104. As long as the fluid pressure in conduit 94, representative of the flow through conduit 20, is above a predetermined minimum value, the vane 106 will be carried against vent nozzle 107 and the supply pressure of nozzle 108 will be established in conduit 109. Of course, when the fluid pressure in conduit 94 falls below a value predetermined by the adjustment of valve 105, vane 106 will be carried against supply nozzle 108 and conduit 109 will be vented to atmosphere. Thus, conduit 109 is maintained at either the supply pressure of nozzle 108 or at atmosphere pressure.

Manifold Pipe 116

The fluid pressure supply of conduit 109 is applied to manifold pipe 116. Pipe 116 is termed a manifold pipe because it simultaneously supplies two diaphragm operators in developing control action to make it possible to carry out objects of the invention. Diaphragm operator 110 controls the conversion valves. Diaphragm operator 117 controls the cycling of the tower valves.

Conversion Valves—Diaphragm Operator 110

Diaphragm operator 110 has its stem urged upward by spring 111 and downward by the fluid pressure in conduit 109. The stem of operator 110 is shown in its lower position to which it is carried by the supply pressure in conduit 109. The stem of diaphragm operator 110 is mechanically connected to the stem of valve 112.

The valve 112 may take the form of a snap-acting valve manufactured by Barworth, Inc. and which is disclosed and claimed in U.S. Patent 2,860,660, issued November 18, 1958. For purposes of the present disclosure it is necessary only to understand that the valve element 113 is carried between two positions by movement of the valve stem. Thus, the valve element 113 is alternately positioned to connect conduit 114 with supply pressure or to atmosphere through manually operated valve 115.

Conduit 114 supplies the diaphragms of valves 62, 63, 65—68, and 65A—68A. Valves 62 and 63 are arranged to normally close under the force of their individual springs. The application of the supply pressure of conduit 114 to the underside of the diaphragms of these valves will open them and convert the closed cycle type of regeneration system of FIG. 1 to an open cycle type of regeneration system. Valves 65—68 and 65A—68A are arranged to normally open under the force of their individual springs. The application of the supply pressure of conduit 114 to the top of the diaphragm of these valves will close them an isolate motor-compressors 50 and 50A from the first and second circuits.

Note is to be taken of the fact that conversion and isolation by valves 62, 63, 65—68 and 65A—68A is disclosed as one-way. Valve element 113 is shown in what might be termed its normal position. By normal is meant that position in which valve element 113 isolated supply pressure from the conversion valves and the regeneration circuit functions as a closed, captive, or recycled circuit. The complete system is operating normally in that the flow in the second circuit is above the predetermined minimum limit set by valving a certain pressure through valve 105 into bellows 104. Valve 115 has been opened, placing atmosphere pressure in pipe 114 and then closed to prepare pipe 114 for connection to supply pressure. Thereafter, when pipe 114 is placed in communication with supply pressure, the conversion and isolation takes place. However, a return of the flow in the regeneration circuit, and return of valve element 113 to the position shown, will leave the supply pressure trapped in pipe 114 and on the diaphragm of the conversion valves. This desired result will prevent automatic return of the system to the closed cycle type of reactivation system until visual inspection ascertains the cause of the low-flow in the regeneration circuit. Manual opening of valve 115 will then return the system to the normal, closed cycle type at the choice of operating personnel.

Of course, it is contemplated that the automatic isolation of the motor-compressors 50 and 50A with valves 65—68 and 65A—68A could be eliminated and manually operated valves substituted for the diaphragm valves 65—68 and 65A—68A shown. While the conversion and isolation functions of valves 62, 63 and 65—68 and 65A—68A are taking place, differential valve 54 is modulating the flow of regeneration gas through the second circuit under the direction of the fluid pressure control signal developed in pipe 102. Thus the regeneration flow is controlled on both open and closed cycle operation, regardless of whether motor-compressors 50 and 50A are in the system, or isolated for repairs or replacements.

Tower Switching—Diaphragm Operator 117

It is desirable to "freeze" the actuation of the tower valve system at whatever position it assumes when the predetermined minimum flow of the regeneration circuit is reached and maintained. Therefore, when the flow through conduit 20 falls to the predetermined value, established by the setting of valve 105, the fluid pressure impulse in pipe 109 will cause valves 62 and 63 to open. The same fluid pressure impulse of 109 is simultaneously applied to a system of diiaphragm operators which, with attached valves, will control the impulse in pipe 75 to maintain it at the value it had when the low-flow condition of the regenerative circuit occurred.

The pressure in manifold pipe 116, as a monitoring impulse to the tower switching system, will now be considered. Diaphragm opeartor 117 actuates its valve to normally block one end of pipe 118. The other end of pipe 118 is connected to the valve of a diaphragm operator 119 so that alternate positions of diaphragm operator 119 will connect its end of pipe 118 to supply pressure or vent it to atmosphere. Diaphragm operator 119 is connected to pipe 75 by pipe 120 so that fluctuation of the fluid pressure in pipe 75 between supply and atmosphere pressure will actuate the valve of diaphragm operator 119 to position its valve so it will connect a fluid pressure supply to its end of pipe 118 or vent its end of pipe 118 to atmosphere. When the value of the fluid pressure in pipe 109 falls to the atmospheric value, diaphragm operator 117 connects its end of pipe 118 to pipe 75 through its valve and pipe 121.

By connecting pipe 118 to pipes 121 and 75, diaphragm operator 119 maintains the pressure of pipe 75 at either its maximum or minimum value, depending upon which value existed at the time the connection was made. If the diaphragm operator 119 was pressured to the maximum value of the pressure in pipe 75, pipe 118 would connect the supply pressure through the valve of diaphragm operator 119 into pipes 121 and 75 so that this pressure would be maintained in pipe 75. If, at the time the connection to pipe 118 was made, the value of the pressure in pipe 75 was at a minimum, diaphragm operator 119 would keep pipe 75 vented to atmosphere, through pipe 118. Thus, when the low-flow condition occurred in conduit 20 of the regeneration circuit the cycle will be converted to an open cycle from a closed cycle and the tower switching will be stopped at the position during which the malfunction occurred if the flow condition continued to be low. However, during the open cycle condition, regulation of valve 54 will continue under the modulation of the output of controller 97 if the flow increases above the low-flow condition and the temperature of the regeneration circuit remains below a predetermined minimum.

Before continuing with the complete analysis of the tower switching function, and its monitoring by the pressure in manifold pipe 116, the control action generated by the temperature detected by element 64 is examined. The temperature, as an operative variable of the regeneration, is applied to the system htrough particular mechanisms of controller 55.

*Temperature Controller 125*

The fluid pressure regulating signal of pipe 102 is, in effect, monitored by the temperature detected by element 64. The conversion-isolation fluid pressure control signal in pipe 109 is also applied, as a monitor, to the tower-switching valve system shown on FIG. 4. The monitoring by temperature element 64 in conduit 33 will be analyzed first.

The temperature sensed by element 64 in a first temperature of the regeneration circuit as an operative variable of the circuit. The fluid pressure established in pipe 102 by controller 97 is routed through a valve actuated by diaphragm operator 122 as long as the temperature sensed by element 64 is below a predetermined maximum value. Pipe 123 is connected to pipe 102 through the valve of diaphragm operator 122, and the modulating impulses from controller 97 are continuously applied to valve 54 regardless of whether or not the set point controller 98 converts the regeneration cycle to the open type.

Temperature element 64 specifically establishes its impulse in controller 125 which is similar to controller 97. The output of controller 125 is established in pipe 124 for application to diaphragm operator 122. As long as the temperature of the regeneration circuit remains below the predetermined maximum, element 64 can not develop a force to expand the bellows of controller 125 and place sufficient fluid pressure in pipe 124 to depress the stem of operator 122 against its spring force and shift its valve to disconnect pipes 102 and 123. However, temperature higher than the predetermined minimum will connect pipe 123 to supply and open valve 54 to its maximum to decrease the differential across the motor-compressors 50 and 50A and stop them. With motor-compressors 50 and 50A stopped, the flow in conduit 20 ceases, and the output of set-point controller 98, in pipe 109, goes to a minimum value and stays there. In this manner, the temperature at 64 becomes an overriding, positive index which has a predetermined maximum value which will convert to open-cycle although the regeneration flow was above its converting value. With the temperature index applied to over-ride the flow in the regeneration circuit and drop the flow positively, the system is arranged to "freeze" the actuation of the tower valve system as described supra.

*Differential Pressure in Conduit 5*

Controller 55 has thus far been described as a mechanism responsive to operative variables of the regeneration, captive, or closed circuit to convert the circuit to an open circuit when one of the operative variables goes out of its limits. Additionally, it is indicated how the tower switching will be halted when the flow in the regeneration circuit falls to a predetermined value. However, the present invention is centered around the use of the control index of differential pressure across valve 54 in conduit 5, the main stream. Control pipes 150 and 151 extend from each side of valve 54, in conduit 5, to controller 55 to carry out the objects of the invention.

Pipes 150, 151 extend to opposed bellows 152, 153 in differential transmitter 154. Transmitter 154 is quite similar to flow transmitter 90. Bellows 152, 153 are opposed on beam 155. The force developed by these bellows on one end of beam 155 rotates the beam about its pivot. Beam 155 has a fluid pressure coupling in the form of a vane and nozzle, at the other end of the beam. The output fluid pressure developed by the vane and nozzle, supplied fluid pressure in the order of 20 p.s.i., is placed in conduit 156. The fluid pressure of conduit 156 is not only the output of the transmitter 154 but is routed by conduit 157 as an input to bellows 158 to balance the differential force of bellows 152, 153 on beam 155. The variation of output fluid in conduit 156 is thereby given a definite functional relation to the differential pressure drop across valve 54. When the valve of the differential, and correspondingly the valve of the transmitter output in conduit 156, reaches a predetermined value the valve control conduit 114 is pressured from supply exactly as it can be alternately pressured from valve 112. The result is the same, conversion from closed to open cycle. More specifically, valve 159 is arranged to connect pipe 114 to either supply or atmospheric pressure by manual manipulation of valve 160. The supply pressure is applied, through this system, to open valves 63 and 61 and close valves 65—68 and 65A and 68A when the differential pressure across main stream valve 54 reaches a predetermined value. This differential pressure is, therefore, an operative variable of the first circuit or main stream, which is a direct index of the operability of the motor-compressor units. When multiple motor-compressor units are employed to drive the closed regeneration circuit, this variable, differential pressure, is the force used by the present invention to call for the conversion from closed to open cycle operation.

Time-Cycle Controller 41

The operation of controller 55 has now been explained in sufficient detail to formulate the concept of the invention. The description now returns to the complete analysis of the tower switching function and its monitoring by the pressure in manifold pipe 116. This analysis was carried to the connection of pipe 75 to pipes 120 and 121 and set aside to complete the description of the controller 55. The description now completes the analysis of tower switching.

Pipe 75 is cycled between the maximum pressure of supply and the minimum pressure of atmosphere by one of the two output control impulses of time-cycle controller 41. In FIG. 4 time-cycle controller 41 is shown in sufficient detail to illustrate the control impulses developed, and co-ordinated, to actuate the tower valves 10, 14, 23, 27, 11, 15, 24, 28 and heating-cooling valve 40 in the regenerative circuit.

The second of the two impulses switches valve 40 to alternately route the regenerative gas of conduit 51 to conduits 42 and 43. The first impulse is developed to simultaneously actuate each of tower valve 10, 11, 14, 15, 23, 24, 27, and 28 between their two positions in alternately routing the main and regenerative streams through the towers 8 and 9.

The second control impulse to valve 40 is co-ordinated with the first impulse to the tower valves. It provides for hot regenerative gas to be first directed through one of the adsorbent beds. It then provides for cool regenerative gas to reduce the bed temperature before the main stream is switched to the tower.

The co-ordination of the development of the two impulses of controller 41 is illustrated by two cams mechanically linked together. Cams 70 and 71 are mounted on a common shaft 72 so they will be turned together at a predetermined rate by a motor. The lobes of cams 70 and 71 actuate separate vane-nozzle combinations to develop fluid pressures as the impulses to actuate their respective valves. Specifically, vane 73 is carried between two positions by the profile of cam 70 to alternately advance and retreat from nozzle 74. Nozzle 74 is supplied the fluid pressure in the order of 20 p.s.i. through an orifice restriction and the back pressure developed by the vane 73, advanced to cover nozzle 74, is transmitted by pipe 75 to the tower valve system. Cam 71 is shown related to a nozzle-vane in such a way that it can develop a similar fluid pressure to be applied to the diaphragm of valve 40.

Pipe 75 is connected to the diaphragm of valve 76. Valve 76 has two positions which alternately route the supply of fluid pressure to pipes 77 and 78. As shown in FIG. 4 a spring 79 can position the valve stem of 76 upward to move its land to where it will block the port to pipe 77. When the port to pipe 77 is blocked, the supply pressure is applied to pipe 78. The supply pressure in pipe 78 is simultaneously applied to the tower valves through the connection shown in FIG. 4.

The valves are grouped with respect to towers 8 and 9 and with respect to those groups controlling the main and regenerative streams to each of the towers. Thus, in co-ordination with FIGS. 1 and 2 the supply pressure in 78 is shown as applied to the bottom of the diaphragms of valves 10 and 14 to open these valves and connect the main stream to conduits 6, 12 and 16 so the stream will flow through tower 8. Simultaneously, valves 23 and 27 are closed by reason of the fluid pressure in pipe 78 being applied to the top of their diaphragms. The similar groups of valves on tower 9 are simultaneously acuated by the fluid pressure of pipe 78 in order to pass the regenerative stream of gas through tower 9.

During the period illustrated by FIGS. 1 and 2, the regenerative stream is passing through tower 9 for the reason that valves 24 and 28 are open while valves 11 and 15 are closed. These valves of tower 9 are in this position because spring 79 has been overcome to position the stem of valve 76 upward. Spring 79 is able to position the stem of 76 downward when the fluid pressure impulse in pipe 75 is at a minimum. The impulse in conduit 75 is shown at a maximum because flapper 73 is at its minimum distance from nozzle 74 by reason of its contact with the smaller radius of cam 70.

During the period of time that flapper 73 rides on the low position of cam 70, cam 71 turns its profile with respect to its flapper to develop a fluid pressure for the diaphragm of valve 40 which will position it to first shunt the regenerative gas through heater 44 and then pass the unheated gas of the regenerative cycle through tower 9. Roughly, the heating and cooling periods of regenerative gas passing through tower 9 are evenly divided over the total period the regenerative gas passes through tower 9.

Tower Temperature at 41A

The present invention contemplates that the fluid pressure impulses developed in pipe 75 will be controlled when an operative variable of the regenerative circuit exceeds a predetermined value. Specifically, FIG. 3 illustrates a system for maintaining the positions attained by the valves of FIG. 4 when the flow through regenerative cycle conduit 20 falls to a predetermined minimum value. The motive means for the time-cycle controller 41 will continue to rotate cams 70 and 71 at a constant rate but the control system in which the invention is embodied will manipulate the first impulse developed by cam 70 to maintain the tower valves in their open or closed position occupied when the flow through conduit 20 fell to its predetermined minimum value.

The present invention also contemplates that the second fluid pressure impulse developed by cam 71, of controller 41, for heating-cooling valve 40, will be controlled when an operative variable of the regenerative circuit reaches a predetermined value. The operative variable applied as a monitor is, specifically, the temperature in conduit 29 as this conduit 29 carries the gas of the regenerative circuit away from the beds of towers 8 or 9. This second temperature of the second circuit is also used to simultaneously monitor the tower valve switching. The result achieved is to hold the bed receiving cool regeneration gas in the second circuit and connected to the source of cooling gas, until it lowers to at least a predetermined relatively cool temperature at which the bed can be connected to the main stream without dumping a dangerous amount of heat down the main stream. The danger of injury to downstream equipment with excessive heat has been discussed.

In FIG. 4, conduit 29 is shown with temperature responsive element 41A sensing the temperature of the regenerative stream. Cam 71 is rotated to permit flapper 130 to be positioned by its spring so the flapper and nozzle 131 are brought together to develop the highest value of fluid pressure impulse possible in pipe 132. This fluid pressure control signal is conducted into pipe 133, and applied to the diaphragm of valve 40 to connect conduit 51 to conduit 42. Thus, cooling-heating valve 40 routes the regeneration gas going to tower 9 through heater 44. This heated gas passes into tower 9 to desorb the products deposited in the adsorbent bed by the processed gas.

Temperature element 41A is responding to the coolest temperature of gas in conduit 29 at the time in the cycle illustrated in the drawings. Therefore, element 41A is developing its smallest amount of power on bellows 134. Flapper-beam 135 is positioned by its spring to so restrict the flow from nozzle 136 as to develop the maximum output of transmitter 137.

The output fluid pressure signal of transmitter 137 in pipe 138 is applied, in parallel, simultaneously, to diaphragm operators 139 and 140. The relay of diaphragm operator 139 connects pipe 133 to either pipe 132 or exhaust. The relay of diaphragm operator 140 is in pipe 75 so it either permits the first control impulses from time-cycle controller 41 to be applied to tower shifting valve 76 or it traps the control impulses on the diaphragm of valve 76 which is developed at the time the valve of diaphragm operator 140 changes position.

In FIG. 4, both diaphragm operators 139 and 140 are pressured from transmitter 137 to permit the two output impulses of controller 41 to position their respective valves. This condition will continue as the cams 70 and 71 rotate to where the lobe of cam 71 will bleed pipes 132 and 133 to exhaust and cause heating-cooling valve 40 to shift to cool the regenerative gas through tower 9. During the next cooling portion of the cycle, the temperature at element 41A will reach a predetermined high value which will expand bellows 134 and exhaust pipe 138.

When diaphragm operators 139 and 140 have their inputs dropped to atmospheric values, pipe 133 will be connected to exhaust and the diaphragm of valve 76 will have the fluid pressure control impulse placed on it by controller 41 trapped thereon. Until the temperature at element 41A lowers to a predetermined value heating-cooling valve 40 will continue to cool the regenerative gas and the tower valves will hold their position.

If the time the cooling lobe of cam 71 is held against flapper 130 is not as long as the time it takes tower 9 to get down to temperature, the subsequent heating cycle for tower 9 will be shorter than normal. However, the short heating cycle will probably result in tower 9 getting down to the required temperature in adequate time. If the cooling time required for tower 9 is again longer than desired, the system can be inspected for the cause of the unbalance. However, the error between cam time and actual times does not become cumulative.

Review of Operation

The control system of the dehydration and hydrocarbon recovery system of FIG. 1 responds to three variables detected in its regeneration circuit and one variable detected in its main stream circuit while automatically shifting the main stream and regeneration stream between the towers containing adsorbent beds. The automatic shifting of the tower valves is co-ordinated with alternately heating and cooling the regeneration gas so the tower beds will be cooled after the heated regeneration gas has vaporized the water and hydrocarbons from the bed. The system is normally operated as a closed type. The regeneration gas is continuously circulated in a closed circuit to perform its function.

If the flow through the regeneration circuit decreases below a predetermined value the system is connected as an open cycle. The motor-compressors are isolated from the system. The flow in the regeneration circuit is regained on open cycle. The regulation of the flow in the regeneration circuit with the differential valve in the main circuit continues, whether the system is an open or closed cycle. The motor-compressors may be removed when the system is on open cycle to be repaired, or replaced.

If one of the motor-compressor units fails, or starts to fail, the increased load on the remaining unit, or units, is sensed as an increase in differential pressure drop across the differential valve in the main circuit. This index of malfunction of less than all the units is applied to make the conversion because the flow of the regeneration gas may not fall until all the motor-compressor units have failed from overloading. Therefore, the present invention provides for saving the remaining motor-compressor units when one of them malfunctions.

If the temperature of the regenerative circuit directly affecting the motor-compressor exceeds a safe value the differential valve is opened. Keeping the differential valve open by this temperature will keep the system shut down. A system of relays is provided to hold the tower valves at the position they attained when the system shut down because of low-flow in the regeneration circuit. A detailed inspection is required when this excessive temperature develops. The system can then be started up again after repairs.

The temperature of the regeneration circuit which is a direct reflection of bed temperature continuously monitors both the impulse for the heating-cooling valve for the regeneration gas and the impulse for the shifting of the tower valves. If a bed does not cool below a predetermined level it is held on cooling to safeguard dumping its heat into the downstream conduit.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In the removal of water vapor and condensable hydrocarbons from natural gases involving the contact of adsorbent material with a main flow stream of gas with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases, continuously recycling a captive flow of natural gas as the reactivating agent through adsorbent material which has adsorbed water and hydrocarbons from the main flow stream of natural gases, heating the recycled captive flow of reactivating natural gas before the gas is passed through the adsorbent material, mechanically linking the captive flow of reactivating gas to the main flow stream of natural gas at a plurality of locations to transfer the power of the main flow stream to the captive flow of gas with mechanical motions which recycle the reactivating flow of captive gas, condensing and recovering the water and condensable hydrocarbons from the heated reactivating flow of captive natural gas after it has passed through the adsorbent material, sensing an operative variable of the main flow stream related to the effectiveness of the mechanical linking between the captive flow of reactivating gas and the main flow stream of natural gas at at least one of the plurality of locations, and utilizing the operative variable of the main flow stream sensed to connect the flow of reactivating gas and the main flow stream in the unrestricted arrangement of an open cycle system when the value of the variable reaches a predetermined value.

2. Apparatus for removing water vapor and condensable hydrocarbons from natural gas including, a bed of adsorbent material which will remove water and hydrocarbon from natural gas upon contact, a first circuit conducting natural gases through the bed of adsorbent material, a second circuit arranged to alternately conduct reactivating gas through the bed of adsorbent material, means for heating and cooling the reactivating gas in the second circuit, a plurality of motor-compressors with their motors powered by the energy of the gas flowing through the first circuit and their compressors circulating the reactivating gas through the second circuit, a first valve in the first circuit arranged to be modulated in establishing a pressure differential in the first circuit, a first conduit connected to the first circuit upstream of the valve and to the second circuit downstream of the compressors, a second conduit connected to the first circuit downstream of the valve and to the second circuit upstream of the compressors, a second valve in one of the conduits which is normally closed, and means responsive to an operative variable of the motor-compressors as sensed in the first circuit to open the second valve when one of the motor-compressors malfunctions.

3. In the removal of water vapor and condensable hydrocarbons from natural gases involving the contact of adsorbent material with a main flow stream of gas with resultant adsorption of the water and condensable hydrocarbons by the adsorbent material and the subsequent treatment of the adsorbent material with a heated reactivation agent to vaporize and remove the water and condensable hydrocarbons and thereby reactivate the adsorbent material for further contact with the main flow stream of natural gases, continuously recycling a captive flow of natural gas as the reactivating agent through adsorbent material which has adsorbed water and hydrocarbons from the main flow stream of natural gases, heating the recycled captive flow of reactivating natural gas before the gas is passed through the adsorbent material, mechanically linking the captive flow of reactivating gas to the main flow stream of natural gas at a plurality of locations to transfer the power of the main flow stream to the captive flow of gas with mechanical motions which recycle the reactivating flow of captive gas, condensing and recovering the water and condensable hydrocarbons from the heated reactivating flow of captive natural gas after it has passed through the adsorbent material, establishing a pressure differential in the main flow stream across the mechanical linkage between the flow of reactivating gas and main flow stream in accordance with the rate of flow desired for the reactivating gas, sensing the pressure differential in the main flow stream as established by the flow for the reactivating gas, and utilizing the pressure differential to connect the flow of reactivating gas and the main flow stream in the unrestricted arrangement of an open cycle system when the value of the differential reaches a predetermined value.

4. Apparatus for removing water vapor and condensable hydrocarbons from natural gas including, a bed of adsorbent material which will remove water and hydrocarbon from natural gas upon contact, a first circuit conducting natural gases through the bed of adsorbent material, a second circuit arranged to alternately conduct reactivating gas through the bed of adsorbent material, means for heating and cooling the reactivating gas in the second circuit, a set of motor-compressor units powered by the energy of the gas flowing through the first circuit and circulating the reactivating gas through the second circuit, a first valve in the first circuit arranged to be modulated in establishing a pressure differential in the first circuit, a first conduit connected to the first circuit upstream of the valve and to the second circuit downstream of the compressors, a second conduit connected to the first circuit downstream of the valve and to the second circuit upstream of the compressors, a second valve in one of the conduits which is normally closed, and means responsive to the pressure differential across the first valve to open the second valve when the pressure differential across the first valve reaches a predetermined value.

5. The method of removing water and recovering condensable hydrocarbons from natural gas which includes;

contacting a first bed of adsorbent material with a main flow stream of natural gas, whereby water and condensable hydrocarbons are adsorbed by the beds;

contacting the first bed with a captive reactivating flow stream of natural gas while the main flow stream is processed by a second bed of adsorbent material;

continuously recycling the captive reactivating flow stream through the first bed and in a path separate from that of the main flow stream;

periodically shunting the captive reactivating flow stream through a source of heat, whereby its vaporizing capacity is increased before passage through the bed;

cooling the captive reactivating flow stream to its dew point, whereby water from the bed is removed and condensable hydrocarbons are recovered and the temperature of the reactivated bed is reduced for adsorptive service on the main flow stream;

mechanically driving the captive reactivating flow stream in its separate path with a plurality of mechanical motions generated by at least a portion of the main flow stream;

controlling the size of the portion of the main flow stream generating the mechanical motions by the flowing temperature of the reactivating flow stream being driven;

returning the first bed to adsorptive service while regenerating the second bed with the captive flow stream;

sensing an operative variable in the main flow stream which is related to the effectiveness of the mechanical driving by at least one of the mechanical motions;

and utilizing the operative variable sensed to connect the flow of reactivating gas and the main flow stream in the unrestricted arrangement of an open cycle system when the value of the variable reaches a predetermined value.

6. An apparatus for removing water vapor and recovering condensable hydrocarbons from natural gas including;

a first bed of adsorbent material which will remove water and hydrocarbons from natural gas upon contact;

a first circuit conducting natural gases through the first bed;

a second bed of adsorbent material;

a second circuit arranged to conduct a captive reactivating gas through the first bed while the second bed removes water and hydrocarbons from the natural gas in the first circuit;

means for heating the captive reactivating gas in the second circuit;

means for periodically shunting the captive reactivating gas through the heating means, whereby the vaporizing capacity of the gas is increased before the gas passes through one of the beds;

means for cooling the captive reactivating flow stream to its dew point, whereby water from the beds is removed and condensable hydrocarbons are recovered and the temperature of the reactivated bed is reduced for adsorptive service on the main flow stream;

means for mechanically driving the reactivating gas in the second circuit with a plurality of mechanical links moved by a plurality of means actuated by at least a portion of the natural gas in the first circuit;

a first valve in the first circuit arranged to be modulated in establishing the size of the portion of the driving gas of the first circuit by the flowing temperature of the driven gas of the second circuit;

switching means for reconnecting the first bed with the first circuit while connecting the second bed with the second circuit;

a first conduit connected to the first circuit upstream of the first valve and to the second circuit downstream of mechanical links;

a second conduit connected to the first circuit downstream of the first valve and to the second circuit upstream of the mechanical links;

a second valve in one of the conduits which is normally closed;

and means responsive to an operative variable in the first circuit which is related to the effectiveness of the mechanical driving by at least one of the mechanical motions to open the second valve when one of the mechanical motions becomes inefficient a predetermined amount.

7. The method of removing water and recovering condensable hydrocarbons from natural gas which includes;

contacting a first bed of adsorbent material with a main flow stream of natural gas, whereby water and condensable hydrocarbons are adsorbed by the beds;

contacting the first bed with a captive reactivating flow stream of natural gas while the main flow stream is processed by a second bed of adsorbent material;

continuously recycling the captive reactivating flow stream through the first bed and in a path separate from that of the main flow stream;

periodically shunting the captive reactivating flow stream through a source of heat, whereby its vaporizing capacity is increased before passage through the bed;

cooling the captive reactivating flow stream to its dew point, whereby water from the bed is removed and condensable hydrocarbons are recovered and the temperature of the reactivated bed is reduced for adsorptive service on the main flow stream;

mechanically driving the captive reactivating flow stream in its separate path with a plurality of mechanical motions generated by at least a portion of the main flow stream;

controlling the size of the portion of the main flow stream generating the mechanical motions by a differential pressure developed in the main flow stream by the flowing temperature of the reactivating flow stream being driven;

returning the first bed to adsorptive service while regenerating the second bed with the captive flow stream;

sensing the value of the differential pressure developed in the main flow stream as related to the effectiveness of the mechanical motions in driving the reactivating flow stream;

and utilizing the value of the sensed differential pressure to connect the flow of the reactivating gas and the main flow stream in the unrestricted arrangement of an open cycle system when the value of the differential pressure reaches a predetermined value.

8. An apparatus for removing water vapor and recovering condensable hydrocarbons from natural gas including;

a first bed of adsorbent material which will remove water and hydrocarbons from natural gas upon contact;

a first circuit conducting natural gases through the first bed;

a second bed of adsorbent material;

a second circuit arranged to conduct a captive reactivating gas through the first bed while the second bed removes water and hydrocarbons from the natural gas in the first circuit;

means for heating the captive reactivating gas in the second circuit;

means for periodically shunting the captive reactivating gas through the heating means, whereby the vaporizing capacity of the gas is increased before the gas passes through one of the beds;

means for cooling the captive reactivating flow stream to its dew point, whereby water from the beds is removed and condensable hydrocarbons are recovered and the temperature of the reactivated bed is reduced for adsorptive service on the main flow stream;

means for mechanically driving the reactivating gas in the second circuit with a plurality of mechanical links moved by a plurality of means actuated by at least a portion of the natural gas in the first circuit;

a first valve in the first circuit arranged to be modulated in establishing the size of the portion of the driving gas of the first circuit by the flowing temperature of the driven gas of the second circuit;

switching means for reconnecting the first bed with the first circuit while connecting the second bed with the second circuit;

a first conduit connected to the first circuit upstream of the first valve and to the second circuit downstream of mechanical links;

a second conduit connected to the first circuit downstream of the first valve and to the second circuit upstream of the mechanical links;

a second valve in one of the conduits which is normally closed;

and means responsive to the differential pressure drop across the first valve in the first circuit to open the second valve when the differential pressure reaches a predetermined value.

9. Apparatus recovering condensable hydrocarbons from a gaseous stream including, a bed of adsorbent material which will remove hydrocarbons from a gaseous stream upon contact, a first circuit which contacts the bed of adsorbent material with a gaseous stream containing condensable hydrocarbons, a second circuit which contacts the bed of adsorbent material with reactivating gas, means with which to alternately heat and cool the reactivating gas in the second circuit, a series of motor-compressors driven by the energy in the gas of the first circuit and driving the reactivating gas of the second circuit, a valve system between the first and second circuits and the bed of adsorbent material alternately positioned to attach the circuits to the bed, a heating-cooling valve alternately applying the heating and cooling means to the reactivating gas in the second circuit to recover condensable hydrocarbons from the adsorbent bed contacted, a time-cycle controller developing impulses to control the valve system of the bed and the heating-cooling valve in the sequence which will cause the bed to remove hydrocarbons from the gas of the first circuit and deliver them to the gas of the second circuit, a first controller responsive to the flow of the reactivating gas in the second circuit to connect the first and second circuits in the unrestricted arrangement of an open cycle system when the flow falls to a predetermined minimum, and a second controller responsive to the differential pressure drop across the motors of the motor-compressors in the first circuit to connect the first and second circuits in the unrestricted arrangement of an open cycle system when the differential pressure drop reaches a predetermined value.

10. Apparatus recovering condensable hydrocarbons from a gaseous stream including,
 a bed of adsorbent material which will remove hydrocarbons from a gaseous stream upon contact,
 a first circuit which contacts the bed of adsorbent material with a gaseous stream containing condensable hydrocarbons,
 a second circuit which contacts the bed of adsorbent material with reactivating gas,
 means with which to alternately heat and cool the reactivating gas in the second circuit,
 a series of motor-compressors driven by the energy in the gas of the first circuit and driving the reactivating gas of the second circuit,
 a valve system between the first and second circuits and the bed of adsorbent material alternately positioned to attach the circuits to the bed,
 a heating-cooling valve alternately applying the heating and cooling means to the reactivating gas in the second circuit to recover condensable hydrocarbons from the adsorbent bed contacted,
 a time-cycle controller developing impulses to control the valve system of the bed and the heating-cooling valve in the sequence which will cause the bed to remove hydrocarbons from the gas of the first circuit and deliver them to the gas of the second circuit,
 and a controller responsive to the differential pressure drop across the motors of the motor compressors in the first circuit to connect the first and second circuits in the unrestricted arrangement of an open cycle system when the differential pressure drop reaches a predetermined value.

11. Apparatus recovering condensable hydrocarbons from a gaseous stream including,
 a bed of adsorbent material which will remove hydrocarbons from a gaseous stream upon contact,
 a first circuit which contacts the bed of adsorbent material with a gaseous stream containing condensable hydrocarbon,
 a second circuit which contacts the bed of adsorbent material with reactivating gas,
 means with which to alternately heat and cool the reactivating gas in the second circuit,
 a series of motor-compressors driven by the energy in the gas of the first circuit and driving the reactivating gas of the second circuit,
 a valve system between the first and second circuits and the bed of adsorbent material alternately positioned to attach the circuits to the bed,
 a heating-cooling valve alternately applying the heating and cooling means to the reactivating gas in the second circuit to recover condensable hydrocarbons from the adsorbent bed contacted,
 a time-cycle controller developing impulses to control the valve system of the bed and the heating-cooling valve in the sequence which will cause the bed to remove hydrocarbons from the gas of the first circuit and deliver them to the gas of the second circuit,
 a controller responsive to the differential pressure drop across the motors of the motor-compressors in the first circuit to connect the first and second circuits in the unrestricted arrangement of an open cycle system when the differential pressure drop reaches a predetermined value,
 and means for manually disconnecting the first and second circuits from their open cycle system and returning them to their closed cycle system.

References Cited in the file of this patent
UNITED STATES PATENTS
2,957,544 Baker _____ Oct. 25, 1960